United States Patent [19]

Suwa et al.

[11] Patent Number: 5,378,484
[45] Date of Patent: Jan. 3, 1995

[54] PROCESS FOR MAKING AN ANTI-FOAMING AGENT-CONTAINING BEVERAGE

[75] Inventors: Nobuyuki Suwa, Kanagawa; Akio Nishimura, Tokyo; Susumu Miyama; Shinji Katoh, both of Shizuoka, all of Japan

[73] Assignee: Mitsubishi Kasei Corporation, Tokyo, Japan

[21] Appl. No.: 869,952

[22] Filed: Apr. 17, 1992

[30] Foreign Application Priority Data

| Apr. 19, 1991 | [JP] | Japan | 3-088671 |
| Apr. 19, 1991 | [JP] | Japan | 3-088672 |
| Apr. 19, 1991 | [JP] | Japan | 3-088673 |
| Oct. 14, 1991 | [JP] | Japan | 3-265015 |

[51] Int. Cl.$^6$ .............................................. A23L 2/38
[52] U.S. Cl. .................................. 426/329; 426/131; 426/590; 426/569
[58] Field of Search ............... 426/115, 590, 592, 569, 426/131, 329

[56] References Cited

U.S. PATENT DOCUMENTS

| 4,960,602 | 10/1990 | Talkington | 426/804 |
| 5,158,798 | 10/1992 | Fung | 426/804 |

FOREIGN PATENT DOCUMENTS

| 49-32887 | 3/1974 | Japan . | |
| 56-18578 | 2/1981 | Japan | 426/131 |
| 61-242567 | 10/1986 | Japan | 426/131 |
| 62-205757 | 9/1987 | Japan . | |
| 63-102659 | 5/1988 | Japan | 426/131 |
| 1-168248 | 7/1989 | Japan | 426/329 |
| 2-27967 | 1/1990 | Japan | 426/131 |
| 2-27967 | 1/1990 | Japan | 426/131 |

*Primary Examiner*—Carolyn Paden
*Attorney, Agent, or Firm*—Sughrue, Mion, Zinn, Macpeak & Seas

[57] ABSTRACT

A beverage is disclosed which contains an anti-foaming agent comprising, as an effective component, a sucrose fatty acid ester wherein the constituting fatty acid is at least one of a saturated fatty acid having from 12 to 22 carbon atoms and an unsaturated fatty acid having from 12 to 22 carbon atoms, and the average substitution degree is from 4 to 7. A method for forming the beverage is also disclosed.

6 Claims, No Drawings

PROCESS FOR MAKING AN ANTI-FOAMING AGENT-CONTAINING BEVERAGE

FIELD OF THE INVENTION

The present invention relates to a beverage containing an anti-foaming agent.

More particularly, the invention relates to a beverage containing an anti-foaming agent comprising, as an effective component, a sucrose fatty acid ester wherein the constituting fatty acid is at least one of a saturated fatty acid having from 12 to 22 carbon atoms and an unsaturated fatty acid having from 12 to 22 carbon atoms, and the average substitution degree is from 4 to 7.

BACKGROUND OF THE INVENTION

Hitherto, as a beverage contained in a closed container, various kinds of milky and soft drinks contained in cans are on sale. These canned beverages are on sale in cold or hot states by an automatic vending machine, etc.

As the material for the cans, a steel or aluminum is almost always used but bottles and plastic cans are also used for some beverages. In the case of a three-piece steel can for a beverage composed of three parts of upper and lower lid portions and a can trunk, the plate thickness of the can trunk is thick enough to keep the strength of the can trunk high to prevent a dent even when an inner pressure of the can is reduced. On the other hand, in the case of a two-piece aluminum can composed of two parts of a can trunk and a lid portion, for preventing the occurrence of denting of the can trunk composed of a thin plate, these cans are sold with an increased inner pressure of the can with a carbon dioxide gas as seen in canned beer and Coca-Cola (registered trade name). Accordingly, when such an aluminum can filled with Coca-Cola or beer at a high pressure is opened after shaking, bubbles foamed in the headspace and the content in the can spurt out of the can to sometimes cause a trouble of staining the hand and clothes of the consumer. Recently, a beverage such as milk coffee, milk tea, Wulong tea, chocolate drink, sports drink, etc., is filled in the two-piece aluminum or steel can together with liquid nitrogen and has been on sale as a can having a high inner pressure.

When a canned beverage is on sale as such a positively pressurized can and when the can is shaken by a consumer before opening the top or the can is taken out of a vending machine and is shaken during transporting in a car, a considerable amount of bubbles form in the blank head space in the can, and the bubbles are sprayed simultaneously with opening the lid and scattered around from the open portion to cause a problem of giving an unpleasant feeling to the consumers. Particularly in some cases, it becomes the habit with consumers to shake a can before opening, e.g., with a can containing milk coffee, etc., since, there is indicated on the can that the can is shaken before drinking for dispersing well the contents. Thus, the foregoing problem happens often.

For solving such a problem, some ideas are considered such as applying a new function to the opening portion of a can so that the content does not spurt out when the can is opened. For applying such a function, however, there are many technical difficulties, whereby no sufficiently satisfactory result has been obtained so far.

Also, another attempt is proposed to make a low foaming beverage composition which shows low foaming property even if the can is shaken before opening. However, since a beverage such as coffee, tea, powder milk, etc., is, in itself, liable to foam, there exist other technical difficulties.

As the result of various investigations under the above-described circumstances, the inventors have discovered that by adding an anti-foaming agent comprising a specific sucrose fatty acid ester as the effective component to a beverage, in a can containing the beverage, the occurrence of the content spurting out of the can and scattering on opening the can after shaking the can before opening can be prevented and have succeeded in attaining the present invention based on such discovery.

SUMMARY OF THE INVENTION

The object of the present invention is, therefore, to provide a beverage containing an anti-foaming agent for solving the aforesaid problem in spurting out and scattering of the content at opening the can, even after shaking.

According to the present invention, there is provided a beverage containing an anti-foaming agent comprising, as the effective component, a sucrose fatty acid ester wherein the constituting fatty acid is at least one of a saturated fatty acid having from 12 to 22 carbon atoms and an unsaturated fatty acid having from 12 to 22 carbon atoms, and the average substitution degree is from 4 to 7.

DETAILED DESCRIPTION OF THE INVENTION

The invention is described in detail.

As the beverage of the present invention, there are low-acidic beverages such as coffee (sugar-containing coffee, no-sugar coffee, milk coffee etc.), Wulong tea, green tea, cocoa, black tea, milk cocoa, milk tea, etc., contained in cans, bottles, or other tightly sealed containers.

The anti-foaming agent being used for the beverage of the present invention comprises the following specific sucrose fatty acid ester as the effective component.

In the specific sucrose fatty acid ester being used in the present invention, the constituting fatty acid is at least one of a saturated fatty acid having from 12 to 22 carbon atoms and an unsaturated fatty acid having from 12 to 22 carbon atoms and the average substitution degree is from 4 to 7.

In the present invention, the term "average substitution degree" means an average bonded number of esterified fatty acid to one molecule of sucrose constituting the sucrose fatty acid ester.

As the bonded fatty acid, there are saturated fatty acids such as lauric acid, myristic acid, palmitic acid, stearic acid, etc., and unsaturated fatty acids such as oleic acid, ricinoleic acid, etc., singly or as a mixture thereof.

These sucrose fatty acid esters have an average substitution degree of from 4 to 7, that is, each contains many tri-, tetra-, penta-, hexa-, or hepta- esters. In the case of sucrose fatty acid esters each containing many monoesters or diesters, that is having an average substitution degree of 3 or less, the solubility thereof in water is greatly increased, whereby the anti-foaming effect cannot be expected. Also, if the average substitution degree is over 7, the dispersibility thereof in water is lowered and thus the effective advantage can not be expected.

The term "constituting fatty acid" in the sucrose fatty acid ester being used in the present invention and in the sorbitan fatty acid ester which will be described later, means a main constituting fatty acid, a content of which is usually at least 50% of the whole constituting fatty acids. That is, fatty acids in various fatty acid esters are obtained using a mixture of fatty acids derived from edible fats and oils as a raw material and it is not always easy to separate a fatty acid as a single component having a purity of about 100%. Therefore, the purity of a single constituting fatty acid in a sucrose fatty acid ester, which is commercially available is usually from about 70% to 95%.

The sucrose fatty acid esters, in which the constituting fatty acid is at least one of a saturated fatty acid having from 12 to 22 carbon atoms and an unsaturated fatty acid having from 12 to 22 carbon atoms, and the average substitution degree is from 4 to 7 may be used singly or as a combination of two or more kinds thereof. Also, since, in general, an anti-foaming agent of a low melting point has a tendency of being excellent in the anti-foaming effect at a low temperature, whereas an anti-foaming agent of a high melting point has a tendency of being excellent at a high temperature, a combination of the sucrose fatty acid ester having a melting point of not higher than 30° C. and the sucrose fatty acid ester having a melting point of not lower than 50° C. is particularly preferred so that the anti-foaming effect may be stably maintained in a wide temperature range of from usually 5° C. to 60° C. at which canned beverages are on sale. The ratio of the sucrose fatty acid ester having a melting point of not higher than 30° C. to the sucrose fatty acid ester having a melting point of not lower than 50° C. is usually from 1/5 to 5/1, and preferably 5/1 by weight ratio.

The anti-foaming agent being used for the beverage of the present invention may be the individual specific sucrose fatty acid ester or may be combined with various additives for maintaining the anti-foaming effect in a wide temperature range.

Preferred embodiments of the anti-foaming agent composed of such a combination include the following two embodiments.

1. An anti-foaming agent comprising (1) the sucrose fatty acid ester wherein the constituting fatty acid is a saturated fatty acid having from 12 to 22 carbon atoms and the average substitution degree is from 4 to 7 and (2) at least one kind selected from a sucrose fatty acid ester wherein the constituting fatty acid is a saturated fatty acid having from 6 to 10 carbon atoms or an unsaturated fatty acid having 12 to 22 carbon atoms, and the HLB value thereof is 7 or lower, a sorbitan fatty acid ester, a glycerol fatty acid ester, and a polyglycerol fatty acid ester.

2. An anti-foaming agent comprising (3) the sucrose fatty acid ester wherein the constituting fatty acid is an unsaturated fatty acid having from 12 to 22 carbon atoms and the average substitution degree is from 4 to 7 and (4) at least one kind selected from a sucrose fatty acid ester wherein the constituting fatty acid is a saturated fatty acid having from 12 to 18 carbon atoms and the HLB value thereof is 7 or lower, a sorbitan fatty acid ester, a glycerol fatty acid ester, and a polyglycerol fatty acid ester.

In the foregoing embodiments, the component (1) or (4) generally has a melting point of at least 50° C. and shows a large anti-foaming effect in the temperature range of mainly from 20° C. to 60° C. On the other hand, the component (2) or (3) generally has a melting point of not higher than 30° C. and is excellent in the anti-foaming effect in the temperature range of mainly from 5° C. to 20° C. Accordingly, by using these components in combination, the anti-foaming effect in the wide temperature range of from 5° C. to 60° C. can be attained. Also, in this case, the weight ratio of component (1) to component (2) or the ratio of component (3) to component (4) is usually from 1/5 to 5/1, and preferably from ⅓ to 3/1.

The amount of the anti-foaming agent being used for the beverage of the present invention is usually from 0.001 to 0.1% by weight, and preferably from 0.005 to 0.05% by weight based on the weight of the beverage. When the amount of the anti-foaming agent is more than 0.1% by weight, the cost of the beverage is increased and as the case may be, the taste of the beverage is deteriorated. On the other hand, if the amount of the anti-foaming agent is less than 0.001% by weight, the anti-foaming effect of this invention cannot be expected.

Furthermore, the beverage of the present invention may contain a hydrophilic emulsifying agent for further increasing the dispersibility of the anti-foaming agent in water at a low temperature.

As the foregoing hydrophilic emulsifying agent, an emulsifying agent having an ability for emulsifying the sucrose fatty acid ester in water as the effective component of the anti-foaming agent and having an HLB value of at least 10 is preferred. Practical examples of the hydrophilic emulsifying agent include a polyglycerol fatty acid ester, a sorbitan fatty acid ester, a polyoxyethylenesorbitan fatty acid ester, and a sucrose fatty acid ester. They can be used singly or as a mixture thereof and a sucrose fatty acid ester is preferably used.

As the sucrose fatty acid ester which is used as the hydrophilic emulsifying agent, a sucrose fatty acid ester wherein the constituting fatty acid is at least one of a saturated fatty acid having from 12 to 22 carbon atoms and an unsaturated fatty acid ester having from 12 to 22 carbon atoms and the average substitution degree is from 1 to 1.6, that is, a sucrose fatty acid ester containing many monoesters or diesters, is preferably used. A sucrose fatty acid ester containing at least 50% by weight monoesters, at least 60% by weight monoesters is particularly used. These sucrose fatty acid esters have an anti-foaming faculty as compared with the aforesaid sucrose fatty acid ester as the anti-foaming agent for use in the present invention but are excellent in the faculty of emulsifying the main components in water. If the average substitution degree of the sucrose fatty acid ester as the emulsifying agent is 2 or higher, it becomes difficult to uniformly and stably emulsify the anti-foaming agent.

In the combination use of the anti-foaming agent and the hydrophilic emulsifying agent, the anti-foaming agent and the hydrophilic emulsifying agent are usually added to water in a weight ratio of 1/50 to 50/1 followed by stirring at about 70° C. to provide an emulsion. The amount of water in the emulsion is optionally determined in consideration of the stability, handling conditions, etc., of the emulsion. The concentrations of the anti-foaming agent and the hydrophilic emulsifying agent are usually from 2.5 to 60% by weight, and preferably from 5 to 40% by weight of the emulsion.

In the case of using a heated mixture on preparing the canned beverage, the anti-foaming agent for use in the present invention may be directly added to the mixture and also in the case of using the beverage cooled to a temperature of 30° C. or lower, the anti-foaming agent is added to the mixture as an emulsion thereof, whereby the anti-foaming agent can be uniformly added to the mixture. The beverage thus containing the anti-foaming agent is filled in empty cans by a filling machine and simultaneously or subsequently, pouring liquid nitrogen in the can or adding liquid nitrogen dropwise into the can, the can is tightly sealed to provide a positively-pressurized can.

Depending on a demand and purpose, the beverage of the present invention may properly contain other additives, for example, lecithin, a glycerol fatty acid ester, a polyglycerol fatty acid ester, a sorbitan fatty acid ester, a propylene glycol fatty acid ester, an edible oil, and a dimethylsilicone oil.

In the anti-foaming agent-containing beverage of the present invention, the anti-foaming property is maintained in a wide temperature range and the foamed amount of the content after shaking the easily foamable beverage is greatly reduced. Also, the deterioration in the taste of the drink beverage according to the present invention due to the addition of the anti-foaming agent is scarcely observed.

Accordingly, the anti-foaming agent-containing beverage of the present invention is suitable as a canned drink and can greatly contribute to the production of a positively-pressurized canned beverage which scarcely spurts out the content even after shaking.

The present invention is hereinafter described in more detail with reference to examples, which are not to be construed as limiting the scope thereof. Unless otherwise indicated, all parts, percentages and ratios are by weight.

The contents and properties of the sucrose fatty acid esters, etc., used in the examples are as shown in Table 1 below.

TABLE 1

| Product Mark | Name | Constituting Fatty Acid | | Average Substitution Degree | HLB Value | Distributor |
|---|---|---|---|---|---|---|
| | | Carbon Atom No. | Fatty Acid Purity (%) | | | |
| L-095 | Sucrose Lauric Acid Ester | 12 | 95 | 6.4 | <1 | Mitsubishi Kasei Food Co., Ltd. |
| L-195 | " | 12 | 95 | 5.5 | 1 | Mitsubishi Kasei Food Co., Ltd. |
| P-170 | Sucrose Palmitic Acid Ester | 16 | 70 | 5.5 | 1 | Mitsubishi Kasei Food Co., Ltd. |
| P-1670 | " | 16 | 70 | 1.2 | 16 | Mitsubishi Kasei Food Co., Ltd. |
| S-170 | Sucrose Stearic Acid Ester | 18 | 70 | 5.3 | 1 | Mitsubishi Kasei Food Co., Ltd. |
| S-270 | " | 18 | 70 | 4.1 | 2 | Mitsubishi Kasei Food Co., Ltd. |
| S-370 | " | 18 | 70 | 2.3 | 3 | Mitsubishi Kasei Food Co., Ltd. |
| S-1170 | " | 18 | 70 | 1.6 | 11 | Mitsubishi Kasei Food Co., Ltd. |
| O-070 | Sucrose Oleic Acid Ester | 18 | 70 | 6.6 | <1 | Mitsubishi Kasei Food Co., Ltd. |
| O-170 | " | 18 | 70 | 5.5 | 1 | Mitsubishi Kasei Food Co., Ltd. |
| OS-170 | Sucrose Oleic Acid-Stearic Acid Ester | 18 | 70 | 5.2 | 1 | Mitsubishi Kasei Food Co., Ltd. |
| ER-190 | Sucrose Erucic Acid Ester | 22 | 90 | 5.4 | 1 | Mitsubishi Kasei Food Co., Ltd. |
| ER-290 | " | 22 | gb | 4.3 | 2 | Mitsubishi Kasei Food Co., Ltd. |
| O-30 | Glycerol Oleic Acid Ester | 18 | — | — | 4 | Taiyo Kagaku Co., Ltd. |
| G-H | Glycerol Capric Acid Ester | 6 | — | — | 4 | " |
| G-D | Glycerol Capric Acid Ester | 10 | — | — | 3 | " |
| G-P | Glycerol Palmitic Acid Ester | 16 | — | — | <1 | " |
| G-Li | Glycerol Linoleic Acid Ester | 18 | — | — | 4 | " |
| PR-100 | Polyglycerol Ricincleic Acid Ester | 18 | — | — | 3 | Riken Vitamin Co., Ltd. |
| PG-O-5 | Polyglycerol Oleic Acid Ester | 18 | — | — | 5 | Taiyo Kagaku Co., Ltd. |
| PG-O-7 | " | 18 | — | — | 7 | " |
| PG-O-8 | " | 18 | — | — | 8 | " |
| SPAN-65 | Sorbitan Stearic Acid Ester | 18 | — | — | 2 | Kao Atlas Co., Ltd. |
| So-L | Sorbitan Lauric Acid Ester | 12 | — | — | 5 | Taiyo Kagaku Co., Ltd. |
| So-O | Sorbitan Oleic Acid Ester | 18 | — | — | 5 | " |

EXAMPLES 1 TO 7 AND COMPARISON EXAMPLES 1 TO 3

To milk coffee prepared by the composition of 2% instant coffee, 0.8% skim milk powder, 0.16% whole milk powder, and 10% sugar was added 0.02% each of the anti-foaming agents such as the sucrose fatty acid esters, etc., shown in Table 2 below, followed by heating the mixture to a temperature of at least 60° C. to disperse the anti-foaming agent. The milk coffee, thus formed, was filled in a 250 ml aluminum can together with liquid nitrogen followed by sealing to provide a canned milk coffee. An inner pressure of the can was adjusted to 1. 2 kg/cm$^2$. After sterilizing the can in a retort oven at 125° C. for 20 minutes, the can was stored for one day at 55° C. Immediately after shaking the can 10 times by means of a shaker (made by Yayoi Co., Ltd.), the can was opened and a spurted out amount of the content was measured from the difference of the weight of the can before and after shaking thereof.

The results are as shown in Table 2 below.

TABLE 2

| Sucrose Fatty Acid Ester*[1] | Average Substitution Degree | Amount Spurted (g) SOT*[2] | RT*[3] |
|---|---|---|---|
| Ex. 1 L-095 | 6.4 | 0.080 | 0.165 |
| 2 L-195 | 5.5 | 0.081 | 0.085 |
| 3 P-170 | 5.5 | 0.095 | 0.105 |
| 4 S-170 | 5.3 | 0.085 | 0.090 |
| 5 O-170 | 5.5 | 0.070 | 0.105 |
| 6 ER-290 | 4.3 | 0.080 | 0.095 |
| 7 OS-170 | 5.2 | 0.095 | 0.075 |
| Comp. Ex. 1 | — | 0.67 | 1.19 |
| 2 S-370 | 2.3 | 0.415 | 0.490 |
| 3 O-30*[1] | — | 0.390 | 0.317 |

*[1]Glycerol fatty acid ester
*[2]Stay-On-Tab End Can
*[3]Ring Tab End Can

EXAMPLES 8 TO 17 AND COMPARISON EXAMPLE 4

In a 2 liter stainless steel beaker was poured 1,000 g of a commercially available canned milk coffee mixture (milky beverage, non-fat milk solid components 3.7%) and the coffee mixture was heated to 70° C. While stirring the coffee mixture with a stirrer, each of the anti-foaming agents shown in Table 2 above was added thereto and the mixture was then homogenized for 5 minutes by means of a TK Homomixer (manufactured by Tokushu Kika Kogyo Co., Ltd.).

The homogenized coffee mixture was poured into a 100 ml graduated test tube and after allowing it to stand for 40 minutes at 5° C., 25° C., and 55° C., the test tube was upset up and down 50 times. Then, the test tube was allowed to stand for 10 seconds and thereafter, the amount of foam thus formed was measured. Said foaming test was carried out twice and the foam-restraining ratio was evaluated by the mean value.

The foam-restraining ratio (%) was calculated by the following equation and the results are shown in Table 3 below.

Foam-Restraining Ratio (%) = [(A − B)/A] × 100

A: Foamed amount (ml) without the anti-foaming agent
B: Foamed amount (ml) with anti-foaming agent The melting point was measured by means of DSC (differential scanning calorimeter, DSC200 Type, manufactured by Seiko Instruments Inc.) after cooling the molten sample to −50° C. and then raising the temperature at a rate of 5° C./minute. The temperature was a molten endothermic peak top temperature.

TABLE 3

| | Composition of Anti-foaming Agent | | | | | | Anti-foaming Effect (Foam-Restraining Ratio) | |
|---|---|---|---|---|---|---|---|---|
| | Component (1) | | | Component (2) | | | | |
| Example No. | Product Mark | M.P. (°C.) | Amount (%) | Product Mark | M.P. (°C.) | Amount (%) | 5° C. (%) | 55° C. (%) |
| Ex. 8 | P-170 | 56 | 50 | L-195 | 27 | 50 | 43 | 91 |
| 9 | P-170 | 56 | 25 | O-070 | <0 | 75 | 93 | 73 |
| 10 | P-170 | 56 | 50 | O-070 | <0 | 50 | 86 | 81 |
| 11 | P-170 | 56 | 75 | O-070 | <0 | 25 | 93 | 85 |
| 12 | P-170 | 56 | 50 | ER-190 | 1.3 | 50 | 40 | 89 |
| 13 | S-170 | 66 | 50 | O-30 | <0 | 50 | 63 | 81 |
| 14 | P-170 | 56 | 50 | PR-100 | <0 | 50 | 68 | 95 |
| 15 | SPAN 65 | 57 | 50 | O-070 | <0 | 50 | 93 | 88 |
| 16 | P-170 | 56 | 100 | — | — | — | 22 | 45 |
| 17 | O-070 | <0 | 100 | — | — | — | 47 | 26 |
| Comp. Ex. 4 | SPAN 65 | 57 | 100 | — | — | — | 4 | 40 |

Example 8

In a 2 liter stainless steel beaker was poured 1000 g of a commercially available canned milk coffee mixture (milky beverage, non-fat milk solid components 3.7%) and the coffee mixture was heated to 70° C. While stirring the coffee mixture with a stirrer, 0.05 g each of sucrose palmitic acid ester (Product name: P-170, an average substitution degree: 5.5, melting point: 55° C.) and sucrose oleic acid ester (Product name: O-070, an average substitution degree: 6.6, melting point: 0° C. or lower) were added thereto and the mixture was then homogenized for 5 minutes by means of a TK Homomixer. The coffee mixture was filled in a 250 ml aluminum can together with liquid nitrogen and the can was sealed. The can was subjected to a retort sterilizing treatment at 125° C. for 20 minutes. One of the cans thus sterilized was stored for one day at 5° C. and another stored for one day at 55° C.

Separately, by following the same procedure as above, canned milk coffee without the emulsion of the anti-foaming agent was prepared as a control.

After vigorously shaking 10 times each of the cans containing the emulsion-added sample mixture and the control can by hand, each can was opened and the spurted out amount of the content was measured. As the results, in the control sample, more than 1 g of the content was spurted out, while no spurting out of the content was observed in the sample containing the emulsion, regardless of the storing temperature conditions.

EXAMPLES 19 TO 33, REFERENCE EXAMPLE 1, AND COMPARISON EXAMPLES 5 TO 7

To 100 parts of an anti-foaming agent composed of component (1) and component (2) shown in Table 4 below was added 12.5 parts of a sucrose palmitic acid ester having an HLB value of 16 as an emulsifying agent to provide an aqueous emulsion having a concentration of 20%.

By adding a definite amount of each aqueous emulsions prepared as described above to each of various easily foamable beverage, the samples each containing the anti-foaming agent as shown in Table 4 below were prepared.

TABLE 4

| Sample No. | Component 1 Product Mark | HLB Value | Amount (wt %) | Component 2 Product Mark | HLB Value | Amount (wt %) | Kind of Drink |
| --- | --- | --- | --- | --- | --- | --- | --- |
| 1 | S-170 | 1 | 0.01 | P-070 | <1 | 0.01 | Milk Coffee |
| 2 | G-P | <1 | 0.01 | ER-190 | 1 | 0.03 | Milk Coffee |
| 3 | So-L | 5 | 0.001 | P-170 | 1 | 0.001 | Milk Tea |
| 4 | L-195 | 1 | 0.02 | So-O/G-D | 4/3 | 0.01/0.01 | Milk Coffee |
| 5 | S-170 | 1 | 0.005 | G-Li | 4 | 0.02 | Milk Coffee |
| 6 | S-170 | 1 | 0.03 | PG-O | 7 | 0.03 | Milk Tea |
| 7 | P-170 | 1 | 0.01 | G-H | 4 | 0.02 | Milk Coffee |
| 8 | S-170 | 1 | 0.01 | P-170 | 1 | 0.01 | Milk Coffee |
| 9 | S-170/L-195 | 1/1 | 0.01/0.01 | G-D | 3 | 0.02 | Black Coffee |
| 10 | S-170/L-195 | 1/1 | 0.01/0.01 | SO-O | 5 | 0.02 | Milk Coffee |
| 11 | S-170 | 1 | 0.06 | — | — | — | Milk Coffee |
| 12 | P-170 | 1 | 0.05 | G-Li | 4 | 0.005 | Milk Coffee |
| 13 | L-195 | 1 | 0.005 | PG-O | 5 | 0.05 | Milk Coffee |
| 14 | S-170 | 1 | 0.01 | PG-O | 8 | 0.01 | Milk Coffee |
| 15 | S-170/L-195 | 1/1 | 0.02/0.02 | So-O | 5 | 0.03 | Milk Coffee |
| 16 | So-O | 5 | 0.06 | — | — | — | Black Coffee |

Each of the various beverages thus prepared was filled in a positively-pressurized can with dropwise adding liquid nitrogen. The inner pressure of the filled can was 2.0 kg/cm$^2$ (at 29° C.). Said inner pressure is considered as being the severest condition in regard to spurting the content out of the can. The cans used were of aluminum and contained 250 ml of beverage. The headspace of the can after filling was 15 mm in thickness.

After filling each mixture in the can, the can was subjected to a retort treatment at 125° C. for 20 minutes. Thereafter, the test for spurting was carried out and the spurted amount was evaluated.

The spurting test was carried out as follows. That is, after shaking each can using a shaking machine at an acceleration of 7.8 G and a shaking width of 25 cm, the can was opened and the amount of the beverage spurted out of the can was measured.

The results obtained are as shown in Table 5 below.

In Reference Example 1, exclusively using a sorbitan fatty acid ester as an anti-foaming agent, it can be seen that the anti-foaming effect is obtained at 5° C. but the anti-foaming effect is greatly reduced by increasing the temperature.

TABLE 5

| Example | Sample No. | Amount Spurted Out at Each Temperature (g) 5° C. | 20° C. | 60° C.* | Taste |
| --- | --- | --- | --- | --- | --- |
| 19 | 1 | 0.16 | 0.12 | 0.14 | ○ |
| 20 | 2 | 0.09 | 0.08 | 0.09 | ○ |
| 21 | 3 | 0.19 | 0.17 | 0.20 | ○ |
| 22 | 4 | 0.07 | 0.09 | 0.08 | ○ |
| 23 | 5 | 0.13 | 0.15 | 0.16 | ○ |
| 24 | 6 | 0.08 | 0.08 | 0.07 | ○ |
| 25 | 7 | 0.10 | 0.10 | 0.11 | ○ |
| 26 | 8 | 0.14 | 0.11 | 0.13 | ○ |
| 27 | 9 | 0.16 | 0.09 | 0.10 | ○ |
| 28 | 10 | 0.13 | 0.11 | 0.10 | ○ |
| 29 | 11 | 0.49 | 0.17 | 0.05 | ○ |
| 30 | 12 | 0.35 | 0.14 | 0.11 | ○ |
| 31 | 13 | 0.38 | 0.19 | 0.12 | ○ |
| 32 | 14 | 0.41 | 0.20 | 0.16 | ○ |
| 33 | 15 | 0.08 | 0.08 | 0.06 | X |
| Ref. Ex. 1 | 16 | 0.09 | 0.20 | 0.62 | ○ |

*The temperature of the mixture in the can

As comparison examples, each of the foregoing easily foamable mixture without containing the anti-foaming agent, was filled in the positively-pressurized can under the same condition as in the aforesaid examples and then the test for spurting was carried out on each can.

The results obtained are shown in Table 6 below.

TABLE 6

| Comparison Example | Sample Beverage | Amount Spurted Out at Each Temperature (g) 5° C. | 20° C. | 60° C.* |
| --- | --- | --- | --- | --- |
| 5 | Milk Coffee | 1.21 | 1.06 | 0.98 |
| 6 | Black Coffee | 0.70 | 0.88 | 0.82 |
| 7 | Milk Tea | 0.41 | 0.59 | 0.45 |

*The temperature of the mixture in the can

EXAMPLES 35 TO 40 AND COMPARISON EXAMPLES 8 AND 9

In a 2 liter stainless steel beaker was poured 1,000 g of milk coffee having a composition of 1.8% instant coffee, 0.8% a skim milk powder, 0.16% whole milk powder, and 8% sugar and the temperature of the milk coffee was controlled to at 25° C. Each of the emulsions of anti-foaming agents as shown in Table 7 below was prepared by stirring the mixture with a stirrer. After adding the emulsion thus prepared to a coffee liquid and the mixture was homogenized for 5 minutes by means of a TK Homomixer (manufactured by Tokushu Kika Kogyo Co., Ltd.).

Each of the coffee beverage was poured in a 100 ml graduated test tube. After subjecting the test tube to an autoclave treatment (under the same condition as the foregoing retort sterilizing treatment) for 20 minutes at 125° C., the test tube was allowed to stand for one day at 55° C. The tube was upset up and down 50 times and then after allowing to stand for a test time for 10 seconds, the amount of foam formed was measured. The foaming test was carried out twice and the anti-foaming effect was evaluated by the mean value.

The results are shown in Table 7 below.

TABLE 7

| | Composition of Anti-foaming Agent (Emulsifying Agent) | | | | | | Amount of Water (%) | Added Ratio of Emulsion to Coffee Liquid (%) | Anti-foaming Effect (Foam-Restraining Ratio) (%) | Stability of Emulsion*1 |
|---|---|---|---|---|---|---|---|---|---|---|
| | Sucrose Fatty Acid Ester*2 | Average Substitution Degree | Compounded Amount (%) | Hydrophilic Emulsifying Agent | Averge Substitution Degree | Compounded Amount (%) | | | | |
| Ex. 35 | S-170 | 5.3 | 20 | S-1170 | 1.6 | 2.5 | 77.5 | 0.05 | 67 | ○ |
| Ex. 36 | S-170 | 5.3 | 10 | P-1670 | 1.2 | 20 | 60 | 0.05 | 67 | ○ |
| | L-195 | 5.5 | 10 | | | | | | | |
| Ex. 37 | S-170 | 5.3 | 2.5 | S-1170 | 1.6 | 25 | 70 | 0.2 | 50 | ○ |
| | L-195 | 5.5 | 2.5 | | | | | | | |
| Ex. 38 | P-170 | 5.5 | 10 | P-1670 | 1.2 | 2.5 | 77.5 | 0.05 | 94 | ○ |
| | ER-290 | 4.3 | 10 | | | | | | | |
| Ex. 39 | P-170 | 5.5 | 10 | S-1170 | 1.6 | 2.5 | 77.5 | 0.05 | 82 | ○ |
| | L-095 | 6.4 | 10 | | | | | | | |
| Ex. 40 | P-170 | 5.5 | 10 | P-1670 | 1.2 | 2.5 | 77.5 | 0.05 | 76 | ○ |
| | O-170 | 5.5 | 10 | | | | | | | |
| Comp. Ex. 8 | S-370 | 2.3 | 20 | P-1670 | 1.2 | 2.5 | 77.5 | 0.05 | 20 | ○ |
| Comp. Ex. 9 | O-30*2 | — | 20 | P-1670 | 1.2 | 2.5 | 77.5 | 0.05 | 20 | X |

*1Emulsion Stability: ○: Stable X: Separated
*2O-30 is glycerol fatty acid ester.

EXAMPLE 41

After dispersing 5 g of a sucrose palmitic acid ester (P-1670, trade name, made by Mitsubishi Kasei Shokuhin K.K., average substitution degree 1.2) in 155 g of water, 20 g of a sucrose stearic acid ester (S-170, trade name, made by Mitsubishi Kasei Food Co., Ltd., average substitution degree 5.3) and 20 g of a sucrose lauric acid ester (L-190, trade name, made by Mitsubishi Kasei Food Co., Ltd., average substitution degree 5.5) were added to the dispersion. After heating the mixture to about 70° C. with stirring by a spatula to form a homogeneous emulsion, the emulsion was cooled to room temperature.

1,000 g of milk coffee having the composition of 1.8% instant coffee, 0.8% a skim milk powder, 0.16% whole milk powder, and 8% sugar was placed in a 2 liter stainless steel beaker and the coffee mixture was heated to 25° C. 0.5 ml of the emulsion prepared as described above was added to the coffee mixture with stirring followed by mixing, and the mixture was homogenized for 5 minutes by means of a TK Homomixer. The milk coffee mixture was filled in a 250 ml aluminum can together with liquid nitrogen and the can was sealed. The can was subjected to a retort sterilizing treatment at 125° C. for 20 minutes, and then stored for one day at 55° C.

By following the same procedure as above, a canned milk coffee not containing the emulsion of the anti-foaming agent was prepared as a control.

After vigorously shaking 10 times each of the cans containing the emulsion-added sample mixture and the control can by hand, each can was opened and the spurted out amount of the content was measured. As the results, in the control sample, more than 1 g of the content was spurted out, while no spurting out of the content was observed in the sample containing the emulsion.

While the invention has been described in detail and with reference to specific embodiments thereof, it will be apparent to one skilled in the art that various changes and modifications can be made therein without departing from the spirit and scope thereof.

What is claimed is:

1. A method for preparing a positively-pressurized canned beverage comprising adding a sucrose fatty acid ester as an anti-foaming foaming agent in an emulsified state in water with a hydrophilic emulsifying agent, wherein the constituting fatty acid of the sucrose fatty acid ester is selected from the group consisting of a saturated fatty acid having from 12 to 22 carbon atoms, and an unsaturated fatty acid having from 12 to 22 carbon atoms, and the average substitution degree is from 4 to 7, to the beverage in an amount sufficient to reduce foaming, and filling the resulting sucrose fatty acid ester-containing beverage into a can.

2. The method according to claim 1, wherein the hydrophilic emulsifying agent is a sucrose fatty acid ester wherein the constituting fatty acid of the sucrose fatty acid ester is selected from the group consisting of a saturated fatty acid having from 12 to 22 carbon atoms and/or an unsaturated fatty acid having from 12 to 22 carbon atoms and the average substitution degree is from 1 to 1.6.

3. The method according to claim 1, wherein the weight ratio of the anti-foaming agent to the hydrophilic emulsifying agent is from 1/50 to 50/1.

4. A method for preparing a positively-pressurized canned beverage comprising filling an empty can with a beverage containing a sucrose fatty acid ester as an anti-foaming agent in an emulsified state in water with a hydrophilic emulsifying agent, wherein the constituting fatty acid of the sucrose fatty acid ester is selected from the group consisting of a saturated fatty acid having from 12 to 22 carbon atoms and an unsaturated fatty acid having from 12 to 22 carbon atoms, and the average substitution degree is from 4 to 7, in an amount sufficient to reduce foaming, adding liquid nitrogen into the can, and sealing the can to provide a positively-pressurized can.

5. The method according to claim 4, wherein the hydrophilic emulsifying agent is a sucrose fatty acid ester wherein the constituting fatty acid of the sucrose fatty acid ester is selected from the group consisting of a saturated fatty acid having from 12 to 22 carbon atoms and/or an unsaturated fatty acid having from 12 to 22 carbon atoms and the average substitution degree is from 1 to 1.6.

6. The method according to claim 4, wherein the weight ratio of the anti-foaming agent to the hydrophilic emulsifying agent is from 1/50 to 50/1.

* * * * *